United States Patent
Shen

(10) Patent No.: US 9,612,965 B2
(45) Date of Patent: Apr. 4, 2017

(54) METHOD AND SYSTEM FOR SERVICING STREAMING MEDIA

(75) Inventor: Bo Shen, Fremont, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 3867 days.

(21) Appl. No.: 10/603,428

(22) Filed: Jun. 24, 2003

(65) Prior Publication Data

US 2004/0267954 A1 Dec. 30, 2004

(51) Int. Cl.
| | |
|---|---|
| H04N 21/2183 | (2011.01) |
| G06F 12/0875 | (2016.01) |
| H04N 19/61 | (2014.01) |
| H04N 19/127 | (2014.01) |
| H04N 19/132 | (2014.01) |
| H04N 19/152 | (2014.01) |
| H04N 19/423 | (2014.01) |
| H04N 19/587 | (2014.01) |
| H04N 19/40 | (2014.01) |
| H04N 19/59 | (2014.01) |

(52) U.S. Cl.
CPC ....... *G06F 12/0875* (2013.01); *H04N 19/127* (2014.11); *H04N 19/132* (2014.11); *H04N 19/152* (2014.11); *H04N 19/40* (2014.11); *H04N 19/423* (2014.11); *H04N 19/587* (2014.11); *H04N 19/59* (2014.11); *H04N 19/61* (2014.11)

(58) Field of Classification Search
USPC .................................................. 375/240.01
See application file for complete search history.

(56) References Cited

U.S. PATENT DOCUMENTS

| | | | |
|---|---|---|---|
| 6,404,814 B1 * | 6/2002 | Apostolopoulos et al. | 375/240.12 |
| 6,574,279 B1 * | 6/2003 | Vetro et al. | 375/240.23 |
| 6,647,061 B1 * | 11/2003 | Panusopone et al. | 375/240.12 |
| 6,999,512 B2 * | 2/2006 | Yoo et al. | 375/240.03 |
| 7,110,664 B2 * | 9/2006 | Yogeshwar et al. | 386/328 |
| 7,292,602 B1 * | 11/2007 | Liu et al. | 370/468 |
| 2002/0126752 A1 * | 9/2002 | Kim | 375/240.03 |
| 2002/0136295 A1 * | 9/2002 | Sato | 375/240.03 |
| 2002/0136310 A1 * | 9/2002 | Saunders et al. | 375/240.25 |
| 2003/0016751 A1 * | 1/2003 | Vetro et al. | 375/240.16 |
| 2003/0227974 A1 * | 12/2003 | Nakamura et al. | 375/240.25 |
| 2004/0013399 A1 * | 1/2004 | Horiguchi et al. | 386/46 |

* cited by examiner

*Primary Examiner* — Christopher S Kelley
*Assistant Examiner* — Christopher Findley
(74) *Attorney, Agent, or Firm* — Wagner Blecher LLP

(57) ABSTRACT

A method and system for servicing streaming media is disclosed. The method includes receiving the streaming media and determining an allocation of available processing and memory resources. In addition, the method includes performing a multi-stage service on the streaming media and caching an intermediate result from one of the stages of the multi-stage process. The intermediate result is selected according to the available processing and memory resources.

27 Claims, 6 Drawing Sheets

METHOD AND SYSTEM FOR SERVICING STREAMING MEDIA

FIELD OF THE INVENTION

Embodiments of the present invention relate generally to streaming media. In particular, embodiments of the present invention relate to a method and system for servicing streaming media.

BACKGROUND OF THE INVENTION

The servicing of streaming media requires an expenditure of both storage and computing resources. The limitations that are inherent in these resources assure that bottlenecks in the servicing process will not be relieved unless these limitations are mediated by an appropriate allocation of system resources. The limitations of system resources are exacerbated by inefficiencies that result from the misallocation of system resources. The bottlenecks that are facilitated by these inefficiencies can serve to help overload the computing and storage resources of the streaming media service system and degrade its overall performance.

Conventional systems do not overcome the above noted service process bottleneck problem. In fact, many conventional systems concentrate on the caching of fully serviced data that is taken from an output of the servicing system which can exacerbate the problem. As is readily apparent the caching of such fully serviced data places a severe load on storage resources. This is because such methodologies expend an excessive amount of the systems storage resources so that the expenditure of computing resources necessary to provide future services may be reduced. However, bottlenecks that arise from the lack of storage availability stemming from such misallocations of the storage resources are prevalent.

A major disadvantage of conventional systems that provide data service and delivery is that the tension on one type of system resource is excessively stretched at the same time that there exist an over abundance of another type of system resource. The inefficiencies that result from such media servicing misallocations facilitate the bottlenecks that degrade system performance.

SUMMARY OF THE INVENTION

Methods and systems for servicing streaming media are disclosed. In one embodiment the method includes receiving the streaming media and determining an allocation of available processing and memory resources. In addition, the method includes performing a multi-stage service on the streaming media and caching an intermediate result from one of the stages of the multi-stage process. The intermediate result is selected according to the available processing and memory resources.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Exemplary System in Accordance with Embodiments of the Invention

Figure 1A:
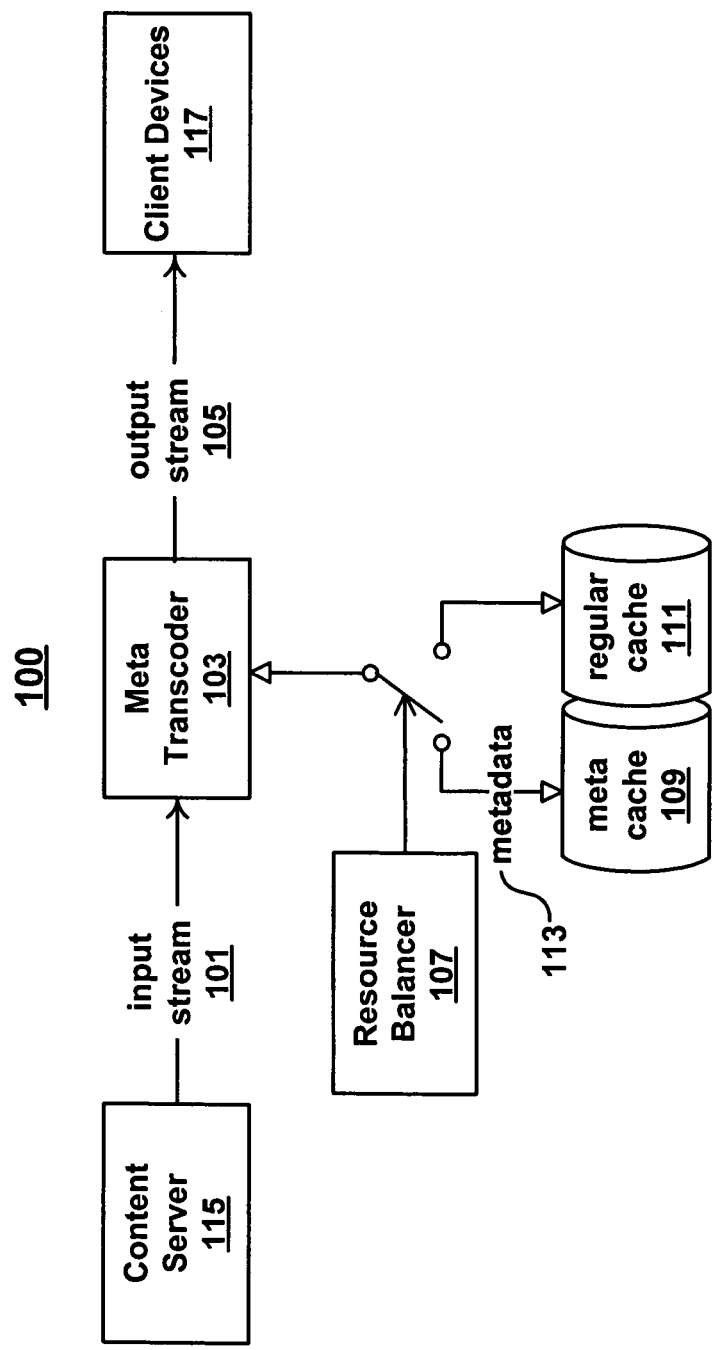
FIG. 1A is a functional block diagram of a transcoding system according to one embodiment of the present invention.

FIG. 1A is a functional block diagram 100 of a transcoding system according to one embodiment of the present invention. It is appreciated that the functional blocks are illustrated separately in FIG. 1 for clarity of illustration and discussion. However, these blocks may not exist as separate elements, and in actual practice may be embodied as a single device or in a number of devices. In general, a transcoding system of the present invention can include one or more (devices) that provide the functionality about to be described.

Embodiments of the present invention optimize system operation by finding an optimized balance between the system resources that are allocated for data (e.g., streaming media data) processing and for data (e.g., streaming media data) storage. FIG. 1 shows input stream 101, meta transcoder 103, output stream 105, resource balancer 107, meta cache 109, regular cache 111, metadata 113, original content server 115 and client device(s) 117.

Input stream 101 carries streaming media that may be delivered to client devices 117 (e.g., laptops, desktops, PDAs, cellphones, etc.). According to one embodiment, the input stream 101 is transcoded by the transcoder 103 in a manner that optimizes system resources. According to one embodiment, the input stream 101 is supplied by a content server 115 (e.g., video content provider etc.). According to other embodiments, the input stream is provided from other sources (e.g., local storage medium, remote storage medium).

A meta transcoder (e.g., 103) is a transcoder that employs metadata in a current transcoding session that was produced and cached in a prior transcoding session. Moreover, a meta transcoder can produce metadata in a current session that will be used in a future similar transcoding session. It should be noted that according to one embodiment, the meta transcoder 103 of the present invention can receive both meta data (intermediate transcoded data retrieved from meta cache 109) and whole data (e.g., such as supplied by a content server 115) as inputs.

In one embodiment, meta transcoder 103 is positioned between an origin content server 115 that provides the input stream 101, and a group of clients 117 that can be supplied the output stream 105. The meta transcoder 103 includes caches that can be retrieved to a meta cache 109 and a regular cache 111. The data that is serviced may consist of both the final results of transcoding and the intermediate results of transcoding termed "metadata" 113. An optimized use of each of these data components can result in the optimized performance of the system.

The transcoding performed by metatranscoder 103 is a multi-stage process. The results of one stage of the process are typically used as inputs to at least one other stage. As used herein "intermediate results" refer to outputs of the various stages prior to the outputs of various stages prior to the final stage of transcoding, while "final results" refer to data which has completed all stages.

Meta cache 109 is used to cache metadata 113. Metadata 113 can be defined as an intermediate result of the transcoding process. The meta cache 109 caches metadata 113 that represents an intermediate transcoding result. For example, consider the case where data is transcoded to obtain "X" by adding a, b, and c. The intermediate result a+b can be considered to be metadata (e.g., 113).

The decision can be made to cache a+b at metatranscoder 103. Subsequent transcoding to obtain "X" therefore would require only one additional processing step (e.g., addition to a+b) instead of two (e.g., adding a plus b, plus c). As will be seen, this is beneficial when the savings in processing warrants the use of additional cache space to store a+b. The present invention, in its various embodiments, achieves an optimized balancing of processing and storage resources available to metatranscoder.

Regular cache 111 is used to cache the final results of the transcoding process. According to one embodiment, these results can be stored when they cost less storage space to cache than intermediate results. According to the present embodiment, the present invention introduces multiple levels of cache instead of a single level as provided by conventional systems.

In the present embodiment, resource balancer 107 directs the allocation of cache resources versus processing resources. The resource balancer determines whether or not more or less transcoding (processing) resources be employed as opposed to caching resources may be employed. Either intermediate transcoding results or final transcoding results may be cached. The resource balancer 107 makes a determination based on factors such as available cache space and available computing cycles. In general, if the system has sufficient idle computing cycles but not enough cache space, intermediate transcoding results (e.g., metadata) instead of final transcoding results can be cached. In contrast, if the system has sufficient cache space but not enough computing cycles, final results instead of intermediate results (e.g., metadata) can be cached.

According to one embodiment, meta transcoding is defined as transcoding based on metadata. It should be appreciated that during a current transcoding session, the transcoder may generate metadata from which it may benefit during similar transcoding sessions that may occur subsequently. In addition, during the transcoding session, the transcoder may be able to benefit from metadata generated in prior transcoding sessions.

Figure 1B:
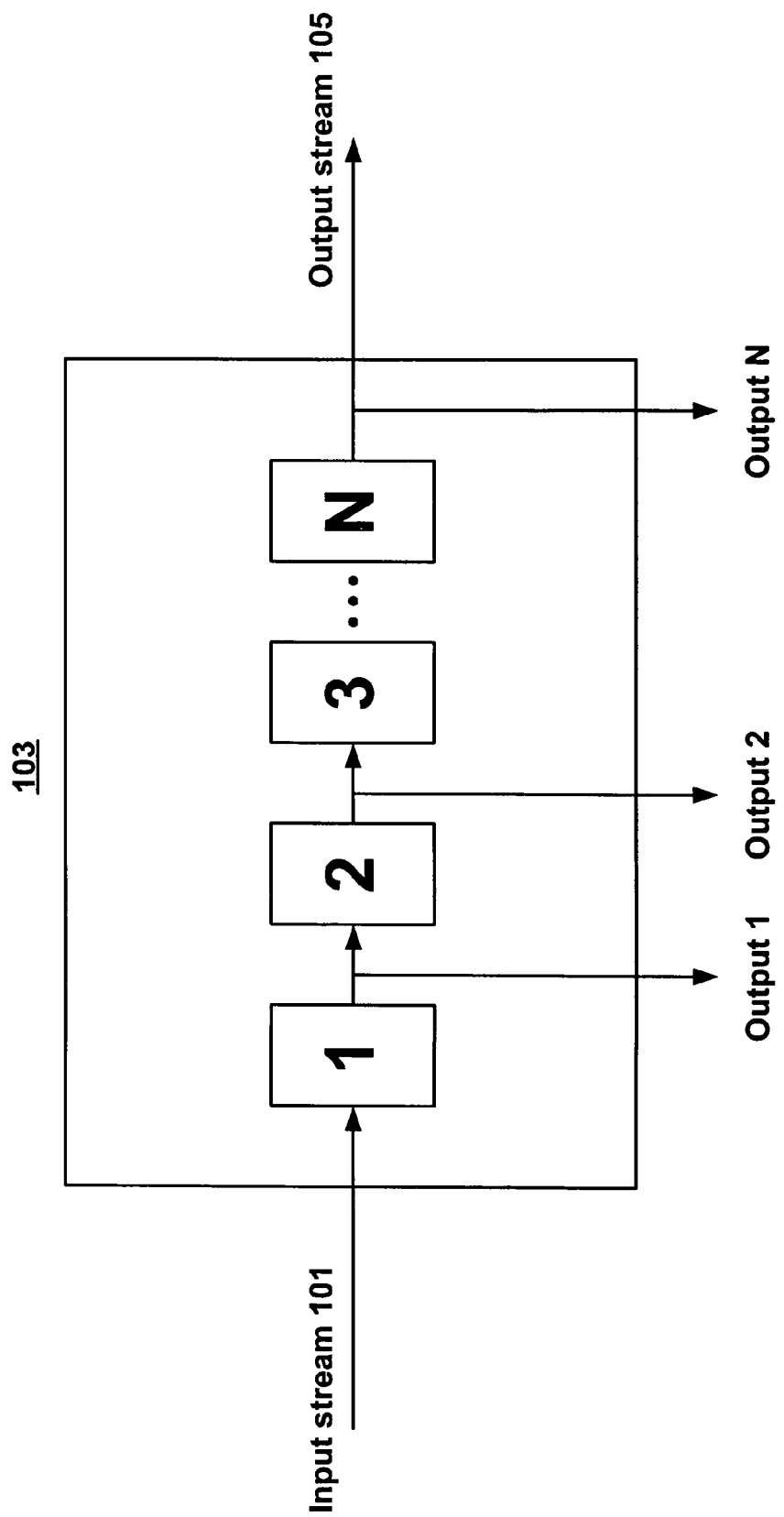
FIG. 1B is a block diagram of an exemplary transcoder structure according to one embodiment of the present invention.

FIG. 1B is a block diagram of an exemplary transcoder structure according to one embodiment of the present invention. It should be appreciated that a transcoding session may involve a plurality of discrete transcoding stages (e.g., show as stages 1 through N in FIG. 1B) each outputting metadata that exists in an intermediate (non final) stage of transcoding completion. According to one embodiment, the metadata that is output from any of the respective transcoder stages can be cached for future use in subsequent similar transcoding sessions. It should be appreciated that, according to exemplary embodiments, the stage of the transcoding process where metadata is cached is selected to provide the most beneficial computing and storage balance. FIG. 1B shows input stream 101, metatranscoder 103, output stream 105, and transcoding stages 1 through N having outputs designated Output 1 through Output N (see FIG. 1B).

Referring to FIG. 1B, an input stream 101 is supplied to meta transcoder 103 from an original content server. As is shown in FIG. 1B the streaming video must travel through N transcoder stages (e.g., shown as stages 1 through N in FIG. 1B) before an output stream 105 of final transcoding results is generated (e.g., such as for supply to client devices). It should be appreciated that the output of any of the respective transcoder stages (e.g., shown as output 1 through output N in FIG. 1B) can be cached and used as an input to the meta transcoder to decrease the computing load in a future similar session. However, the stage where the metadata is actually cached is selected to provide the most beneficial computing and storage balance.

Different Levels of Meta Data to be Cached

Figure 2:
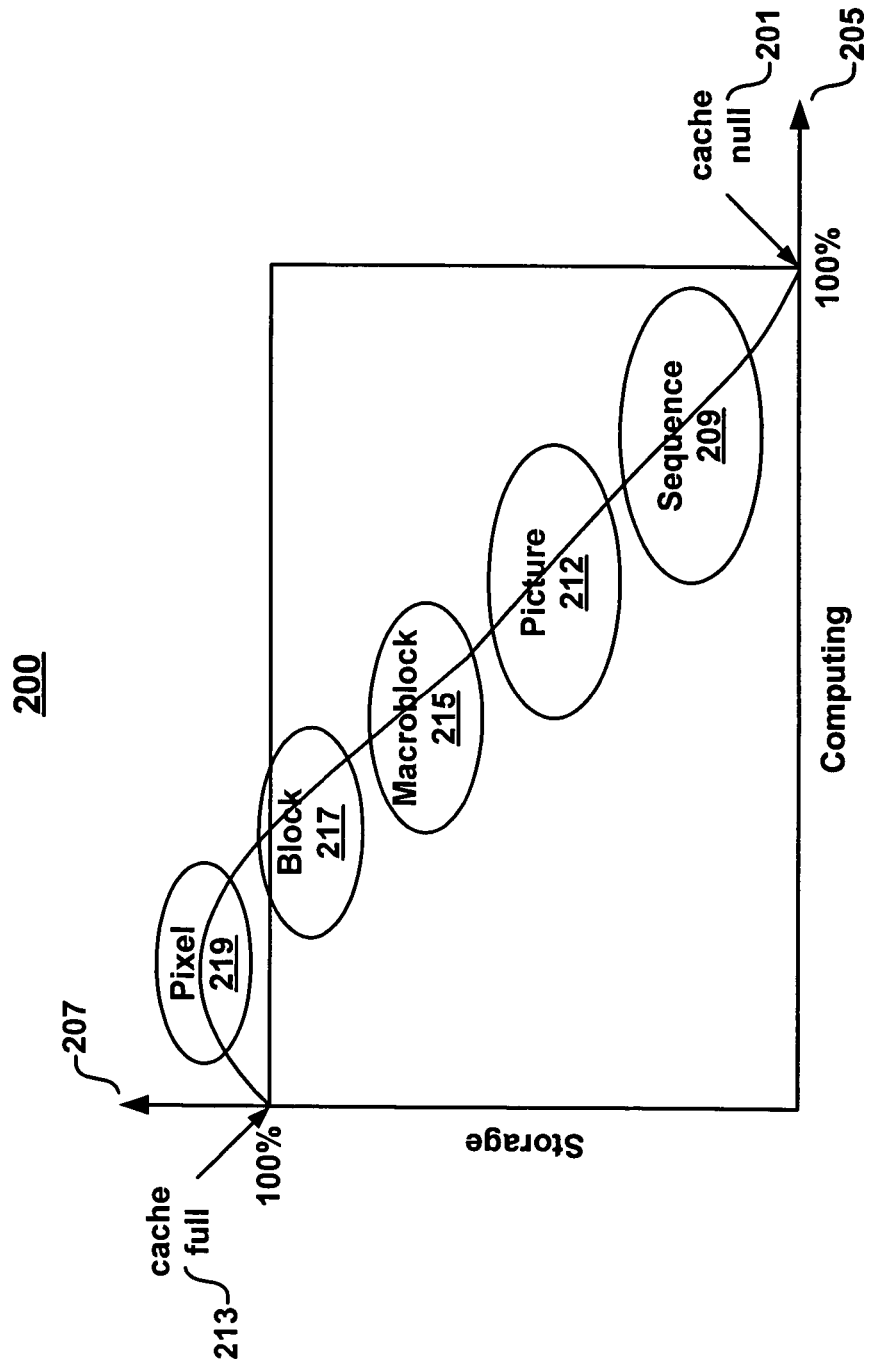
FIG. 2 is a graph that illustrates the computing vs. storage trade-offs between five intermediate levels of metadata that may be cached from sequence level to pixel level according to one embodiment of the present invention.

According to one embodiment, the selection of the metadata (e.g., 113) to be cached should take into account the processing bottlenecks of a transcoding session. Using video transcoding on a compressed MPEG (Motion Picture Experts Group) video stream as the context, the discussion made with reference to FIG. 2 below describes how this can be accomplished. FIG. 2 is a graph 200 that illustrates the relationship between five intermediate levels of metadata that may be cached from sequence level to pixel level according to one embodiment of the present invention. FIG. 2 shows "cache null" 201, "cache full" 213, computing axis 205, storage axis 207, sequence 209, picture 212, macroblock 215, block 217 and pixel 219.

According to one embodiment of the present invention, there are two special levels that may be attained during a transcoding session according to the formulation illustrated in FIG. 2: (1) "cache null" 201 and (2) "cache full" 213. The "cache null" 201 level is attained if no final result nor any of the five levels shown in FIG. 2 is cached for a particular video stream portion that is being transcoded. In the "cache null" 201 case, if there is a future request for data generated during the transcoding session that yielded the null cache, the service system starts a new transcoding session that may involve 100% of the computing resource since no final result nor meta data has been cached that can be used. However, 0% of the storage resource would be involved in the new transcoding session because nothing was cached during the previous transcoding session that occupies this space.

The "cache full" 213 level is attained if the final results of a transcoding session are cached. In the "cache full" 213 case, if there is a future request for data generated during the transcoding session that yielded the full cache, the transcoder can initiate a new transcoding session that may involve 100% of the storage resource since the cache storage is full. However, 0% of the computing resource would be involved in the new transcoding session because final transcoding results that were cached during the previous transcoding session may be utilized.

Sequence level 209 metadata may include but is not limited to header information, total frame number, etc. In general, sequence level 209 metadata describes overall characteristics of an entire segment of a video stream and typically occupies a limited amount of storage space. According to one embodiment, if the system caches intermediate data at the sequence level 209, less of the computing resource, as compared to the "cache null" 201 case, is needed to complete transcoding in response to a future request for this data.

When a transcoding session is initiated, the load on the CPU (central processing unit) may be reduced by using cached intermediate metadata such as sequence level 209 metadata. For example, by using cached sequence level 209 metadata, the new transcoding session can be executed without the necessity of parsing the initial part of the video to obtain the information provided therein, resulting in a simpler initialization process. In addition reduced caching resources are used.

When moving through the levels of intermediate data shown in FIG. 2, from picture level metadata 212 to pixel level metadata 219, the amount of the systems storage resource involved in the transcoding process may increase as metadata located at points of greater vertical magnitude along the storage axis 207 are reached. However, the amount of storage resource that are involved will decrease as more processing resources are utilized.

When moving through the levels of intermediate data shown in FIG. 2, from pixel level metadata 219 to picture level metadata 212, the amount of the systems computing resources that are involved in the transcoding process may increase as metadata (e.g., 113) located at points of greater horizontal magnitude along the computing axis 205 are reached. However, the amount of computing resources that are involved will in general decrease as more caching resources are utilized.

As described above in one embodiment, the present invention provides several levels of caching instead of the one that is provided by traditional caching systems. Embodiments of the present invention take advantage of the different caching levels available and adaptively adjust the resource allocation. For example, to respond to situations where there are multiple requests to the same transcoding service, the system may adaptively respond by choosing to store more metadata (or metadata with less computing requirements) or in the extreme case, caching the final result—the output stream (e.g., 105). The fine granularity thus facilitated enables a more efficient utilization of all the resources (e.g., computing and storage) available on the service platform.

As is shown in FIG. 2, several types of intermediate data (e.g., metadata) are identified for caching to support a streaming media (e.g., video, text, speech, etc.) transcoding system according to one embodiment of the present invention. The caching of these types of intermediate data may facilitate the achievement of good storage and computing tradeoffs as is discussed below.

Metacaching for Frame Rate Reduction

Figure 3:
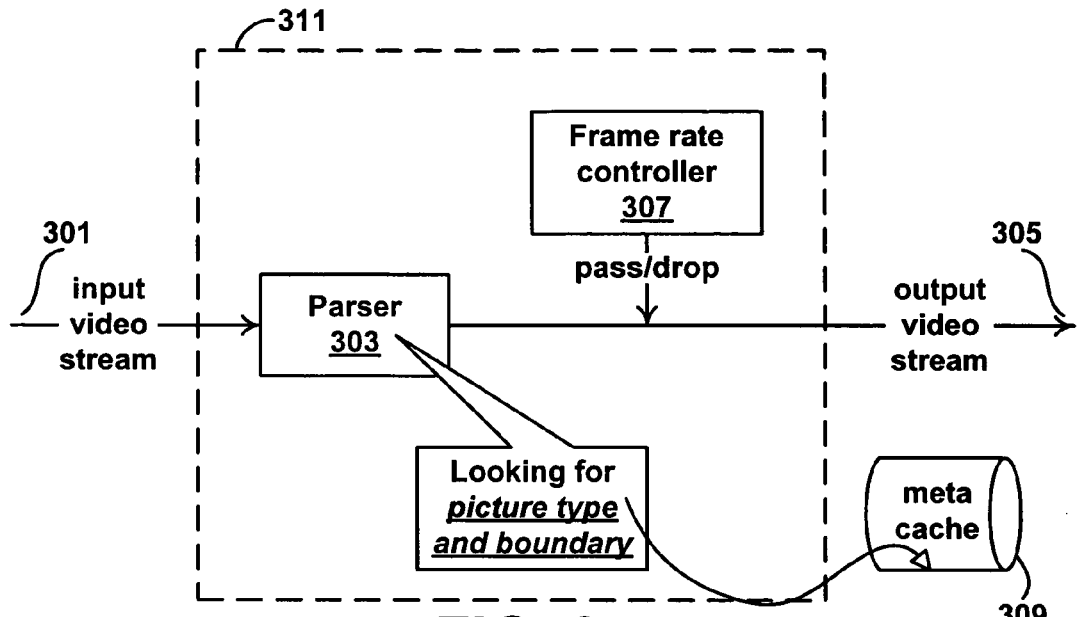
FIG. 3 is a block diagram that shows the functional blocks employed in a system that performs frame rate reduction transcoding on an MPEG (Motion Picture Experts Group) video stream according to one embodiment of the present invention.

FIG. 3 is a block diagram 300 that shows the functional blocks employed in a system that performs frame rate reduction transcoding on an MPEG video stream according to one embodiment of the present invention. According to one embodiment, frame rate reduction may be realized by employing such measures as frame dropping. For example, a frame rate reduction of ⅔ is achieved by dropping the "B" pictures in an MPEG video stream with a GOP (group of picture) structure of IBBPBBPBB. By caching the metadata that is involved in a decision to "pass" or "drop" a frame, the computing load that is carried by meta transcoder 103 of FIG. 1 is reduced in subsequent transcoding sessions that access this cached data. FIG. 3 shows input video stream 301, parser 303, frame rate controller 307, output video stream 305, and meta cache 309. In addition, FIG. 3 shows a dashed line 311 illustration which circumscribes the meta transcoder (e.g., 103) components of the FIG. 3 embodiment of the present invention (e.g., 303 and 307).

Embodiments of the present invention, alleviate a bottleneck in the MPEG video stream transcoding process that can exist at the video stream parsing functional block 303 shown in FIG. 3. According to one embodiment, the purpose of the parsing function is to ascertain the picture type and the byte boundary data related to each frame. This information is supplied to the frame rate controller 307 and can be used in the decision to "pass" or "drop" certain frames. As previously mentioned, by caching the metadata that is involved in a decision to "pass" or "drop" a frame, the computing load on the meta transcoder is reduced in subsequent transcoding sessions where this data is used.

According to one embodiment, for frame rate reduction transcoding, given an input stream with frame rate f fps (e.g., frames per second), a data rate threshold for data caching of the metadata is calculated as follows:

$$R=40f \text{ bits per second.}$$

The above equation is derived as follows. The caching bit rate can be computed using two bits to record the picture type (e.g., I, B, or P), and 38 bits (for a combined five bytes or 40 bits) to record the byte offset of the picture boundary. It should be appreciated that 2 bits are sufficient to record four picture types and 38 bits are sufficient to record offsets in media files up to a size of 512 GB (e.g., gigabytes). This is expected to be more than enough to cover most if not all of the currently available types of media files.

For the discussion herein, R is referred to as the "caching rate threshold." In one embodiment, if the target bit rate of the output stream is smaller than R, then final transcoding results (e.g., "cache full" 213) are cached as opposed to intermediate results (e.g., cache meta) because the data rate needed to cache the meta data does not satisfy the threshold "R". According to one embodiment, a resource balancer (e.g., 107) is employed to determine whether a final or an intermediate transcoding result is cached.

The following example illustrates this, for a video stream 301 with a frame rate of 30 fps. Using the formula provided above (e.g., R=40f bits per second), the caching bit rate may be calculated as 40*30=1200 bits per second (e.g., 1.2 kilobits per second). Consequently, if the target bit rate of the output stream 305 is smaller than R, then "cache full" should be selected instead of cache in meta cache (e.g., 309). It should be appreciated that the constant "40" in the above referenced equation is specifically derived for the case where an MPEG video stream is being serviced. In other cases (e.g., text-to speech, speech to text transcoding, etc.) other constants may be derived.

Because an one megabits per second video can be cached at a rate of about 1 Kbps, the required storage resources can be reduced by 1000 times. Moreover, since the type of picture and its associated byte offset is now readily available in meta cache 309, the meta transcoder can easily service a subsequent transcoding request of the same kind without the parser 303. Therefore, the computation load that is carried by the meta transcoder is significantly reduced.

The cached picture type and byte boundary metadata is located at the picture level of the metadata scheme illustrated in the graph shown in FIG. 2. Consequently, even though more storage resource may be used in caching such metadata as compared to the metadata located at the sequence level (e.g., 209), substantially less computing resources will be needed for a future transcoding (e.g., service) session.

To summarize, in one embodiment, given an input stream (e.g., 301) with a frame rate of f fps, the data rate needed to cache picture type and byte boundary metadata is R=40f bits per second. Frame rate reduction usually leads to bit rate reduction. If the target bit rate of the output stream 305 is smaller than R, then "cache full" selected instead of cache in meta cache (e.g., 309).

Metacaching for Bit Rate Reduction Transcoding

Figure 4:
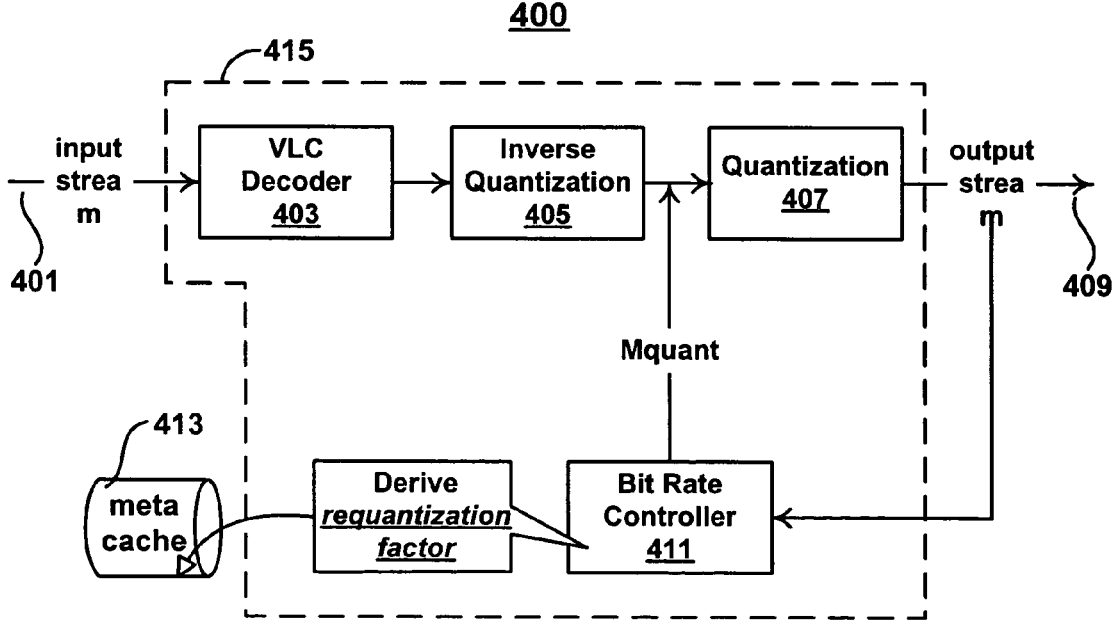
FIG. 4 is a block diagram that shows the functional blocks employed in a system that performs bit rate reduction transcoding on an MPEG video stream according to one embodiment of the present invention.

FIG. 4 is a block diagram 400 that shows the functional blocks employed in a system that performs bit rate reduction transcoding on an MPEG video stream according to one embodiment of the present invention. According to one embodiment, only the bit rate of the output stream (e.g., 409) is reduced for bit rate reduction transcoding. According to one embodiment, parameters such as the video frame rate and the video frame resolution of the transcoded video signal are maintained at constant levels for bit rate reduction transcoding. In addition, FIG. 4 shows a dashed line 415 illustration which circumscribes the meta transcoder (e.g., 103) components of the FIG. 4 embodiment of the present invention (e.g., 403, 405, 407 and 411).

One manner of achieving bit rate reduction is through the requantization of transform domain coefficients. Although there are several bottlenecks in conventional processes that may be considered, the caching of the requantization factor (Mquant) achieves a good tradeoff between storage and computing resource usage. The requantization factor is an intermediate transcoding result that is easier to cache than a final transcoding result. According to one embodiment, the caching of this intermediate transcoding result allows the execution of future transcoding sessions without a need to regenerate such data. FIG. 4 shows input video stream 401, VLC (variable length code) decoder 403, inverse quantization 405, quantization 407, bit rate controller 411, meta cache 413, and output stream 409.

According to one embodiment, the meta cache 413 stores a requantization factor (Mquant) so that it can be obtained from the meta cache 413 instead of having to be generated by the bit rate controller 411. The cached Mquant data can serve to speed up future transcoding sessions, since the processing needed to generate this data during such a future transcoding session need not be reported. As previously mentioned, intermediate transcoding results are cached depending on the trade-off between memory consumption and the amount of remaining processing.

According to one embodiment, for bit rate transcoding, given an input stream (e.g., 401) with resolution w×h, and frame rate f fps, a data rate threshold for data caching of the metadata is calculated as follows:

$$R=whf/32 \text{ bps (bits per second).}$$

If the target bit rate of the output stream 409 is smaller than R, then final transcoding results (e.g., cache full) should be cached as opposed to intermediate results (e.g., cache in meta cache). This is because caching the final result could be accommodated just as easily (e.g., the data rate needed to cache the metadata does not satisfy the threshold "R"). According to one embodiment, a resource balancer (e.g., 107) is employed to determine whether a final or an intermediate transcoding result is cached.

The following example illustrates this point. According to one embodiment, for a 30 second 352×288 30 fps video clip, the size of the cache that is needed to store the Mquant data would be 356400 bytes, and the data rate needed to cache the Mquant meta data would be 95040 bps (e.g., 95040 bits of Mquant data is cached per second). Therefore, for target bit rates of greater than or equal to 95 Kbps, the Mquant metadata would be cached as the caching of such metadata would be beneficial (e.g., the data rate needed to facilitate the caching of the meta data is present and the data will help speed up future similar transcoding sessions). However, for target bit rates of less than 95 Kbps, it would not be beneficial to cache the Mquant metadata since caching a final transcoding result could be accommodated just as easily (e.g., the target data rate is below the data rate needed for caching the Mquant metadata). Furthermore, other cache storage saving techniques may be employed to save cache space, such as using run length encoding to further compress the Mquant data, or the usage of half a byte of storage space for individual Mquant data (so that only half the space is needed). It should be appreciated that the metadata that is cached is located at the macroblock (of size 16×16 for MPEG) level 215 of the graph shown in FIG. 2.

To summarize, in one embodiment, given an input video stream 401 with resolution w×h, and frame rate f fps, the data rate needed to cache requantization metadata is R=whf/32 bits per second. If the target bit rate of the output stream is smaller than R, then "cache full" (e.g., 213) is selected instead of "cache meta" 413.

The other structures shown in FIG. 4 (e.g., VLC decoder 403, inverse quantization 405, and quantization 407 functional blocks) are components well known in the video processing art and thus are not further described herein.

Metacaching for Resolution Reduction Transcoding

Figure 5:
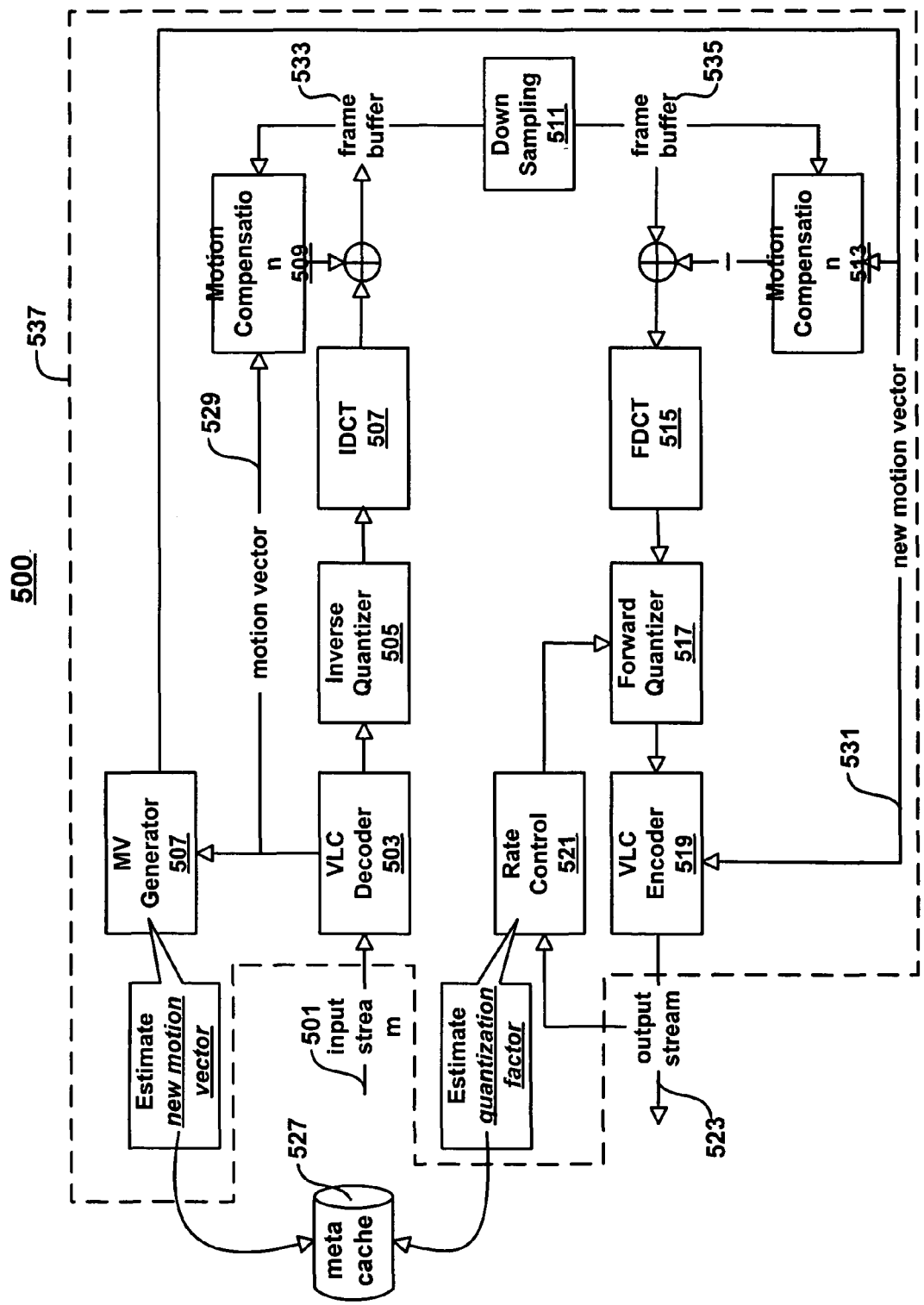
FIG. 5 is a block diagram that shows the functional blocks employed in a system that performs spatial resolution reduction transcoding on MPEG video stream according to one embodiment of the present invention.

FIG. 5 is a block diagram 500 that shows the functional blocks employed in a system that performs spatial or resolution reduction transcoding on MPEG video stream according to one embodiment of the present invention. Spatial resolution reduction may be accomplished by reducing the resolution of each frame and coding the result at a lower bit rate. Although there may be several bottlenecks in a conventional process, caching the motion information and the requantization factor achieves a good tradeoff between storage and computing resources. FIG. 5 shows input stream 501, motion vector generator 507, rate control 521, output stream 523, motion vectors (529 and 531) and meta cache 527. In addition, FIG. 5 shows a dashed line 537 illustration which circumscribes the meta transcoder (e.g., 103) components of the FIG. 5 embodiment of the present invention (e.g., see components circumscribed by dashed line 537 in FIG. 5).

It should be appreciated that in a spatial resolution reduction transcoding process there may be many computing intensive blocks. However, according to one embodiment, two functional blocks, the motion vector generator 507 and the rate control module 521, have been identified as points in the transcoding process where metacaching can be applied to achieve a good storage versus computing tradeoff.

In the video encoding process, the generation of motion vectors (529 and 531) is a computing intensive undertaking. According to one embodiment, by caching the transcoded result of the motion vector generator 507 (an intermediate result as compared to the output stream 523), a subsequent request for a similar service (e.g., transcoding session) can be served with less computing.

According to one embodiment, for spatial resolution reduction transcoding, given an input stream with resolution w×h, and frame rate f fps, and a GOP size of n, a data rate threshold for data caching of the metadata is calculated as follows:

$$R = whf(n-1)/8n \text{(bits per second)}$$

If the target bit rate of the output stream 523 is smaller than R, then final transcoding results (e.g., "cache full" 213) should be cached as opposed to intermediate results (e.g., cache meta 527). This is because caching the final result can be accommodated just as easily (e.g., the data rate needed to cache the meta data is not present). According to one embodiment, a resource balancer (e.g., 107) is employed to determine whether a final or an intermediate transcoding result is cached.

The following example illustrates this point. According to MPEG standards, macroblocks in an inter-picture are associated with up to four motion vectors (e.g., 529, 531). Each motion vector can be represented by 1 byte. Assuming the output stream 523 is a typical Web video of size 352×240, having a bit rate of 1 Mbps, and a frame rate of 30 fps, the data rate needed to cache the metadata is 2*14*330*4*8=288 Kbps, which is close to three times less than the rate needed to cache the final result.

Therefore, for target bit rates that are greater than or equal to 288 Kbps the motion vector metadata is cached as the caching of such metadata would be beneficial (e.g., the data rate needed to facilitate the caching of the meta data is present and the data will help speed up future similar transcoding sessions) to future similar sessions. However, for target bit rates of less than 288 Kbps, it may not be beneficial to cache the motion vector metadata since in such cases caching a final transcoding result could be accommodated just as easily (e.g., the target data rate is below the data rate needed for caching the motion vector metadata).

It should be appreciated that the cached motion vector metadata is at the macroblock (16×16 for MPEG) level 215 as shown in FIG. 2. Consequently, even though more storage resources may be used as compared to the other levels of metadata (e.g., picture, sequence) that may be cached, less computing resource will be needed to service a future request. As an additional matter, it should be noted that the performance of spatial resolution reduction transcoding usually results in bit rate reduction.

According to one embodiment, the intermediate transcoding results from the rate control module 521 can be cached, in a manner similar to what was done in the bit rate reduction transcoding context described above with reference to FIG. 4, as a part of spatial resolution reduction transcoding. The caching of these results can eliminate the need to re-generate a quantization factor that has already been generated and cached. It should be appreciated that the same analysis discussed with reference to FIG. 4 is applicable in this context.

To summarize, in one embodiment, given an output video stream 523 with resolution w×h, frame rate f fps, and a GOP size of n, the data rate needed to cache motion vector metadata (e.g., 529) is R=whf(n−1)/8n bits per second. If the target bit rate of the output stream 523 is smaller than R, "cache full" (e.g., 213) is selected instead of "cache meta" 527.

The other structures shown in FIG. 5 (e.g., VLC decoder 503, inverse quantization 505, quantization 517, VLC encoder 519, forward quantizer 517, FDCT (forward discrete cosine transform) 515, IDCT (inverse discrete cosine transform) 507, motion compensation 509 and 513, down sampling 511, and frame buffer 533 and 535 functional blocks) are components well known in the video processing art and thus are not further described herein.

Exemplary Operations in Accordance with Embodiments of the Invention

Figure 6:
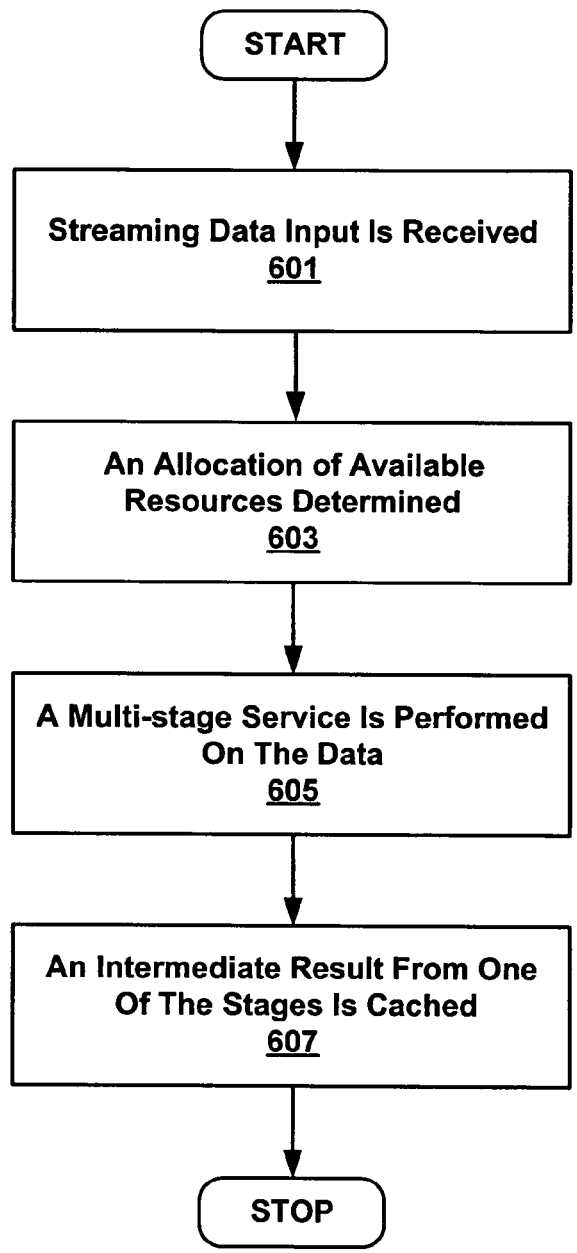
FIG. 6 shows a flowchart illustrating a computer controlled method of servicing streaming media according to one embodiment of the present invention.

FIG. 6 shows a flowchart 600, illustrating computer controlled methods of servicing streaming media according to one embodiment of the present invention. The flowchart 600 include processes which, in one embodiment, are carried out by processors and electrical components under the control of computer readable and computer executable instructions. The computer readable and computer executable instructions reside, for example, in data storage features such as computer usable volatile memory and/or computer usable non-volatile memory. However, the computer readable and computer executable instructions may reside in any type of computer readable medium. Although specific steps are disclosed in the flowchart, such steps are exemplary. That is, the present invention is well suited to performing various other steps or variations of the steps recited in the flowchart. Within the present embodiment, it should be appreciated that the steps of the flowchart may be performed by software, by hardware or by a combination of both.

At step 601, a streaming data input is received. It should be appreciated that the input data may be supplied from a remote server, local storage medium, remote storage medium, etc.

At step 603, an allocation of available processing and memory resources is determined. According to one embodiment, resource allocation is based on available cache space and available computing cycles. It should be appreciated that cache space can be allocated to intermediate transcoding results (e.g., meta data) or final transcoding results.

At step 605, a multi stage service is performed on the data received in step 601 based on the resource allocation determined in step 603. According to one embodiment, the services performed can include but is not limited to video transcoding, text to speech transcoding, and speech to text transcoding.

At step 607, an intermediate result from one of the stages of said multi-stage process is cached. The intermediate result is selected according to the available processing and memory resources. It should be noted that according to one embodiment, the caching of the intermediate results may depend on a target bit rate of the streaming data output satisfying a rate threshold. According to one embodiment, this threshold is the caching bit rate threshold "R". Once this threshold is satisfied resource allocation may be determined, according to one embodiment, by a resource balancer.

As noted above with reference to exemplary embodiments thereof, the present invention provides a method and system for servicing streaming media. The method includes receiving the streaming media and determining an allocation of available processing and memory resources. In addition, the method includes performing a multi-stage service on the streaming media and caching an intermediate result from one of the stages of said multi-stage process. The intermediate result is selected according to the available processing and memory resources.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer implemented method for servicing streaming media comprising:
    receiving, at a computer system, said streaming media;
    determining, at said computer system, an allocation of available processing and memory resources;
    performing, at said computer system, a first multi-stage service on said streaming media;
    caching, at said computer system, an intermediate result from one of the stages of said first multi-stage service, wherein intermediate result types are each associated with a different combination of an amount of memory resource and an amount of processing resource and wherein the type of said intermediate result to be cached is selected according to said available processing and memory resources that corresponds with one of said combinations; and
    performing, at said computer system, a second multi-stage service on said intermediate result.

2. The method of claim 1, wherein said first service is a computing-intensive media services.

3. The method of claim 2, wherein said resources are selected from the group consisting of a transcoder, a first cache, and a second cache.

4. The method of claim 1, wherein said first service comprises transcoding functions.

5. The method of claim 1, wherein one of the stages of said second multi-stage service produces a second result, wherein said second result is a final transcoding result.

6. The method of claim 4, wherein said transcoding functions are selected from the group consisting of frame rate reduction, bit rate reduction and resolution reduction.

7. The method of claim 1, wherein said caching comprises caching intermediate transcoding results of an output stream of said streaming media provided a target bit rate of said output stream of said streaming media is greater than a data caching rate of said streaming media.

8. The method of claim 7, wherein said intermediate transcoding results comprise meta data that is selected from the group consisting of pixel, block, macroblock, picture and sequence.

9. The method of claim 4, wherein said transcoding functions are performed by resources selected from the group that consist of motion vector generator, bit rate controller and parser.

10. A non-transitory computer readable storage medium having computer readable code embodied therein for causing a computer to perform operations comprising:
    receiving streaming media at said computer;
    determining, with said computer, an allocation of available processing and memory resources;
    performing, with said computer, a first multi-stage service on said streaming media;
    caching, with said computer, an intermediate result from one of the stages of said first multi-stage service, wherein intermediate result types are each associated with a different combination of an amount of memory resource and an amount of processing resource and wherein the type of said intermediate result to be cached is selected according to said available processing and memory resources that corresponds with one of said combinations; and
    performing, with said computer, a second multi-stage service on said intermediate result.

11. The non-transitory computer readable storage medium of claim 10, wherein said first service is a computing intensive service.

12. The non-transitory computer readable storage medium of claim 11, wherein said resources are selected from the group consisting of a transcoder, a first cache, and a second cache.

13. The non-transitory computer readable storage medium of claim 10, wherein said first service comprises transcoding functions.

14. The non-transitory computer readable storage medium of claim 10, wherein one of the stages of said second multi-stage service produces a second result, wherein said second result is a final transcoding result.

15. The non-transitory computer readable storage medium of claim 13, wherein said transcoding functions are selected from the group consisting of frame rate reduction, bit rate reduction and resolution reduction.

16. The non-transitory computer readable storage medium of claim 10, wherein said caching comprises
    caching intermediate transcoding results of an output stream of said streaming media provided a target bit rate of said output stream of said streaming media is greater than a data caching rate of said streaming media.

17. The non-transitory computer readable storage medium of claim 16, wherein said intermediate transcoding results comprise meta data that is selected from the group consisting of pixel, block, macroblock, picture and sequence.

18. The non-transitory computer readable storage medium of claim 13, wherein said transcoding functions are performed by resources selected from the group that consist of motion vector generator, bit rate controller and parser.

19. A device for servicing streaming data comprising:
    a processor for determining available processing and memory resources;
    memory for caching an intermediate transcoding result from a stage of a first multi-stage data service, wherein intermediate result types are each associated with a different combination of an amount of memory resource and an amount of processing resource and wherein the type of said intermediate result to be cached is selected according to said available processing and memory resources that corresponds with one of said combinations; and wherein said processor is for performing a second multi-stage service on said intermediate result.

20. The device of claim 19, wherein said first service is a computing intensive service.

21. The device of claim 20, wherein said resources are selected from the group consisting of a transcoder, a first cache, and a second cache.

22. The device of claim 19, wherein said intermediate transcoding result is selected from any of the respective stages of said first multi-stage data service.

23. The device of claim 19, wherein said intermediate result is selected to optimize the balance of processing and memory resources used in providing said first multi-stage data service.

24. The device of claim 19, wherein said device performs transcoding functions that are selected from the group consisting of frame rate reduction, bit rate reduction and resolution reduction.

25. The device of claim 19, wherein said caching comprises caching intermediate transcoding results of an output stream of said streaming data provided a target bit rate of said output stream of said streaming data is greater than a data caching rate of said streaming data.

26. The device of claim 25, wherein said intermediate transcoding results comprise meta data that is selected from the group consisting of pixel, block, macroblock, picture and sequence.

27. The device of claim 24, wherein said transcoding functions are performed by resources selected from the group that consist of motion vector generator, bit rate controller and parser.

* * * * *